United States Patent [19]
Sussman et al.

[11] 3,781,092
[45] Dec. 25, 1973

[54] MONITORING SYSTEM

[76] Inventors: David L. Sussman, RD No. 2, Amhurst, Mass.; Arthur Sussman, 40 Lexington Ave., New York, N.Y.

[22] Filed: June 28, 1971

[21] Appl. No.: 157,567

[52] U.S. Cl.................. 350/266, 350/269, 324/96, 250/227
[58] Field of Search...................... 324/96; 350/266, 350/269, 275; 250/227

[56] References Cited
UNITED STATES PATENTS

| | | |
|---|---|---|
| 3,635,545 | 1/1972 | VanKerkhove et al............. 350/169 |
| 3,633,034 | 1/1972 | Uchida et al. ........................ 350/96 |
| 3,399,347 | 8/1968 | Marten ................................ 324/96 |
| 3,384,885 | 5/1968 | Forbush ............................. 250/227 |
| 3,215,135 | 10/1965 | Franke................................ 350/266 |

*Primary Examiner*—David Schonberg
*Assistant Examiner*—Conrad Clark
*Attorney*—Ralph D. Dinklage et al.

[57] ABSTRACT

A light circuit which is the combination of a laser light source, optical fiber light paths, or more transducers, shutters or other light modulating means and appropriate readout device means which is preferably one which reads out directly in light terms. The transducer imparts information, suitable medical information to the modulator which in turn varies the laser light beam in the optical fiber path. The varied light beam is read directly without any energy converison being necessary.

12 Claims, 5 Drawing Figures

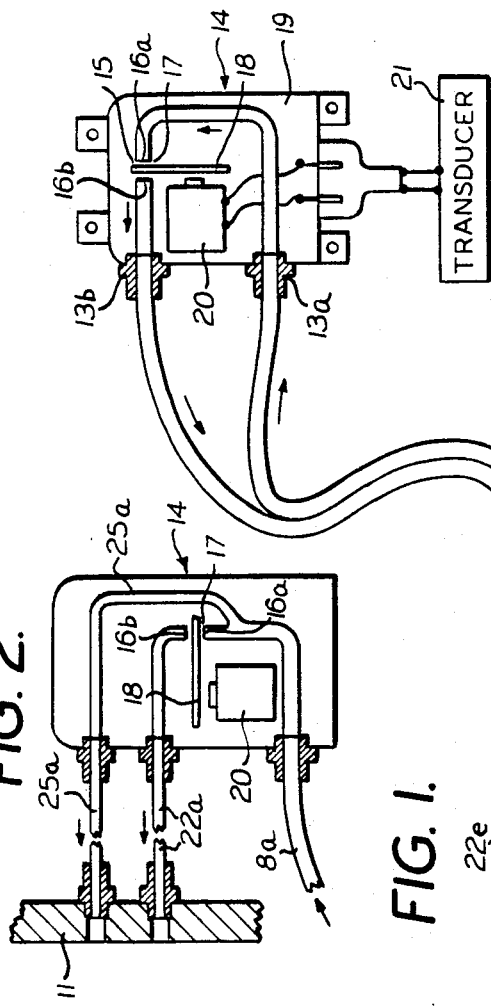
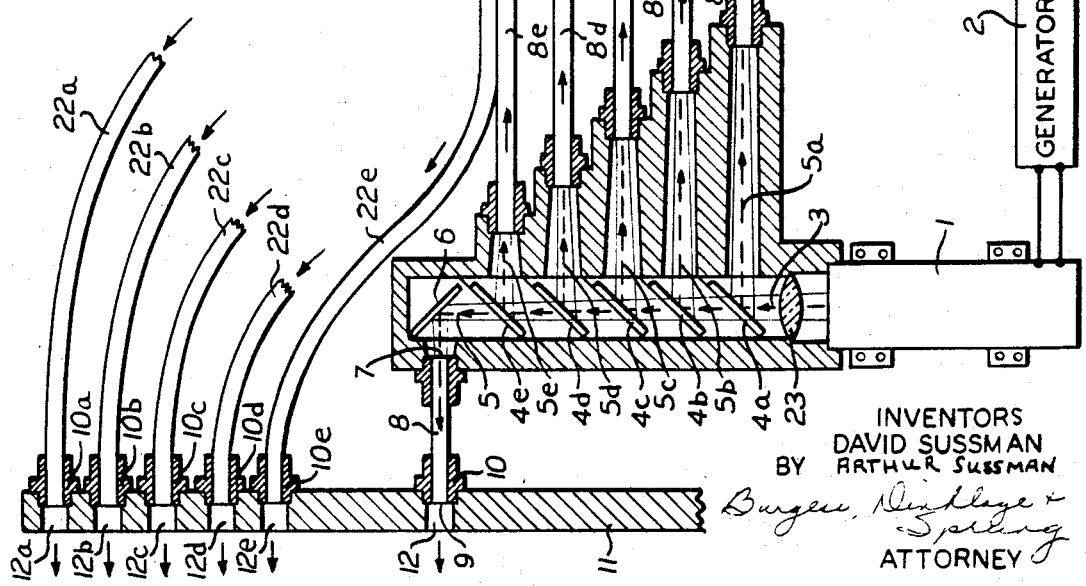
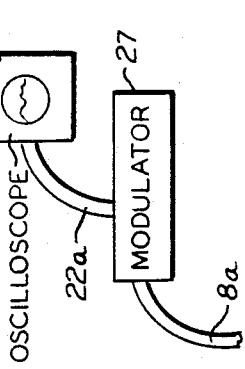
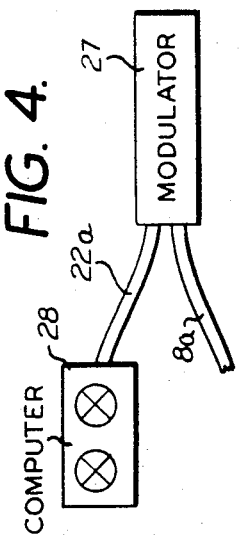
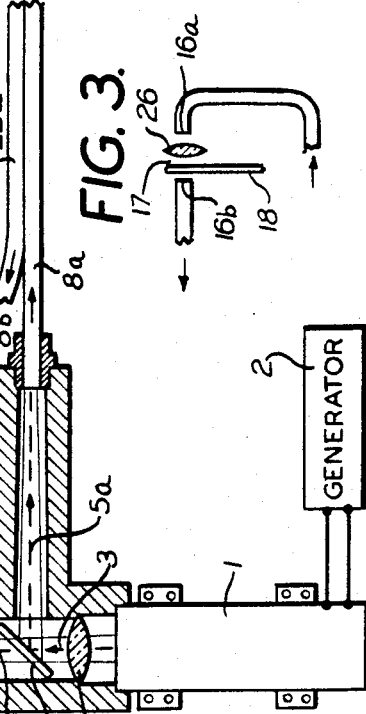

MONITORING SYSTEM

This invention relates to monitoring systems. It more particularly refers to a substantially wholly non-electronic monitoring system.

Passive monitoring systems are well known. In these, some action or activity (or the lack thereof) causes a mechanical or electrical circuit to be activated in some manner so as to advise someone of this activity. The key characteristic of such passive systems is that their energy source is completely inactive unless and until it is activated by some event. On a simple, practical level, a camera is a passive monitoring system.

Active monitoring systems are also well known. In this type of system energy is induced to flow through the system and an interruption or variation in such flow is what is measured and/or recorded by the system. A so-called sniper-scope, in which an infra red beam is sent out and then the reflection scanned through an appropraite viewing means, is an example of one type of active monitoring system.

In the medical field, it is of particular importance that the life signs of a patient be measured and recorded with some degree of regularity. Life signs are such things as heart beat, respiration, pulse, etc. It is well known that there is a shortage of nursing staff in most hospitals and this condition combined with tne necessity or desirability of very frequently measuring the life signs of patients, particularly those in intensive care units and in critical condition, raises problems which are becoming increasingly difficult to cope with.

It would therefore obviously be desirable to be able to monitor at least the most elementary life signs in some manner which would not require a nurse's presence at the patient's bedside. Thus, a monitoring system which would measure the life signs of a patient in a remote location and transmit these to a more central location where many patients could be simultaneously monitored is very desirable.

It is known that a patent's pulse, respiration, heart beat, etc., can be transformed into electronic impulses and thus directly recorded on appropriate means such as a chart. If this is accomplished by a passive system without amplification there is a very real range limitation. That is, the distance of the recording device from the patient can only be a few feet. It is, of course, possible to use an active electronics system with suitable amplifiers in order to transmit the data of a patient's life signs over any significant distance sufficient to make the concept of a central monitoring station viable.

In such an active electronic system, a suitable transducer means would convert a patient's pulse for example into an electronic signal and would impress this signal on a main, carrier current for shipment back to the central recording and monitoring area. The principal problem with this type of system is in its reliability. It is, of course, axiomatic that a monitoring system of the type envisioned here must be as reliable as the human eye and ear, the senses and organs which it is intervening for. Such monitoring system cannot have any greater degree of fallibility than would be present if the patient and nurse were in each others immediate proximity. Such monitoring system must be an error-free intermediary between the patient and the nurse.

While an electronics system can do the monitoring job desired, there is an inherent necessity for converting the electronic signal generated or varied by the life sign measuring transducer into some other energy form, such as sound or light, in order for it to be intelligible to the nurse. Since an electric current is not inherently capable of intelligible discernment by a human being, this current must be used to activate something which readily gives intelligible information to a human observer. This necessary conversion of electronic to visual or audible signal is a weak point in the circuit from a reliability point of view.

Thus in a typical electronic monitoring circuit there are means for generating an electric current, transducer means, means for varying the generated current as a function of the transducer means, and means for reading the varied generated current. This last mentioned reading means may be a simple light bulb or a more elaborate meter means. In any case, it is difficult and expensive to determine with certainty, if the bulb doesn't light or the meter does not indicate, whether the bulb or the meter are inoperative, whether the electric current generator is inoperative, whether the transducer is operative, whether one or more of the wires is broken or whether the patient is dead. Reliability of the instrument is therefore suspect.

It is, therefore, an object of this invention to provide a novel monitoring system.

It is another object of this invention to provide a novel monitoring system which is absolutely reliable.

It is a further object of this invention to provide a novel, non-electronic monitoring system.

Other and additional objects of this invention will become apparent from a consideration of this entire specification including the claims and the drawing hereof.

In accord with and fulfilling these objects, one aspect of this invention resides in a non-electronic monitoring system which utilizes a light beam as its transmission, energy and readout source. The system of this invention constitutes a marked improvement over electronic monitoring systems in that the means which carries the information from the patient to the nurse in the control room is directly readable by the nurse without the necessity of converting this means to some other energy form. This improvement is particularly strong in the reliability aspect.

As will be detailed below, one of the most important aspects of this invention is that not only can patient's life sign or signs be reported directly without the necessity of converting the signal to a different, intelligible kind of energy, but the system and circuit is sel checking. Thus, a single control panel is easily used to directly determine if the laser is lit, if the circuit is continuous and if the patient is well without utilizing any energy directly or indirectly other than the laser light beam.

Understanding of this invention will be facilitated by reference to the accompanying drawing in which:

FIG. 1 is a schematic flow diagram of the system of this invention;

FIG. 2 is a schematic view of a modification of a portion of the circuit shown in FIG. 1;

FIG. 3 is a schematic view of a modification of another portion of the circuit shown in FIG. 1;

FIG. 4 is a schematic view of a modification of still another portion of the circuit shown in FIG. 1; and FIG. 5 is a schematic view of a modification of a further portion of the circuit shown in FIG. 1.

The parts of apparatus used in the system of this invention are an intense light source, preferably a laser; one or more beam splitting means to subdivide the light beam emitted by the laser; focusing means where necessary or desirable to further intensify the light beam; one or more bundles of optical fibers; one or more transducer means for measuring the particular lite sign or signs of interest; and shutter means operated as a function of the transducer and interposed in the path of some of the optical fibers.

According to this invention, collimated light generated by a laser source is preferably focused by a lens system and then passed through a beam splitter. Where appropriate, that is, where the laser beam is polychromatic, the beam splitter may be an optical filter system which differentiates by means of wave length. In any case, the laser beam, or a split portion thereof, is impinged directly on the end of a single optical fiber or preferably a bundle of such fibers. The light passes through the fibers and thence through a shutter means which is interposed in the optical fiber path. The shutter is a per se known piece of equipment which may for example be a meter movement or the like. The shutter is operated by a transducer in a known manner. In fact the transducer itself is a per se known piece of equipment.

The optical fibers are severed to permit the interposition of the shutter therebetween. The severed ends of the fibers are absolutedly axially aligned so that light exiting from one fiber end will impinge directly upon its corresponding severed end provided the shutter does not intervene. If necessary or desirable, an additional lens system may be interposed at this point in order to focus the light exiting one fiber end upon its corresponding fiber end. It is within the spirit and scope of this invention to sever only a portion of the fiber bundle and to have the shutter interposed only between the severed fibers. Other fibers of the same bundle may be left in tact to by pass the shutter means in order to insure and measure reliability of the circuit.

In the preferred embodiment of the invention, the shutter is spring loaded in order to signal not only an out of tolerance patient condition; but also a failure of the shutter itself. This spring loading can be in one of two alternate configurations. It is possible to spring or otherwise load the shutter means so that it is normally interposed in the light guide path or so that it is normally out of the light guide path. In this connection, "normally" refers to the condition of the variable being measured as being within preset acceptable tolerances.

If the shutter is normally spring loaded out of the light guide path, the normal condition observed on the control panel is for the end of the optical fiber to be on, when the variable being measured is within tolerances. Thus when the variable moves outside of the preset limits, the shutter is moved against the spring loading into the light guide path thus "shutting off" the light in the appropriate light guide end at the control panel.

It is, however, preferred in the practice of this invention to operate a simple off-on switch type of modulator in the opposite manner, that is, to have the shutter spring or otherwise loaded into a position interposed in the light path under normal circumstances, so that the fiber end on the control panel is off or unlit when the variable being measured is within tolerances, and is moved out of interposition against the loading pressure if the variable moves out of tolerances thus lighting the control panel fiber end.

It is an important part of this invention that the collimated light beam emerging from the laser be split at least once. This is so even if only one optical fiber bundle and only one transducer are in the circuit. The first portion of the split beam is fed via a separate optical fiber channeled directly to read out and a second portion of the split beam passes through the monitoring circuit as noted above.

The monitoring system of this invention requires no energy conversions for read out because read out is achieved by viewing the laser light emanating from the output ends of the optical fibers in the control panel. The purpose of the one required beam splitter set forth immediately above is fulfilled by merely observing the end of the appropriate bundle of optical fibers. Thus, a control panel read out can be a simple display panel with the ends of the optical fiber bundles observable therein. In one mode of operating this system, when all bundle ends are lit, the observer knows the system is functioning and that the transducer is in some given predetermined condition. In one particular embodiment of this invention which constitutes a very simple go-no-go operation, if the life sign being measured is within an acceptable range, the shutter mechanism is arranged to be out of the light circuit. In this case, the initial fiber end would be lit to indicate that the laser is operating, the by-pass fiber end would be lit to indicate that the circuit is unbroken and the direct, reporting fiber end would be lit to indicate that the life sign is within preset tolerances. Should the laser become non-operational, all lights would go out; should the circuit (that is the fiber bundle) become broken, both the by-pass fiber and the reporting fiber lights would be extinguished but the initial fiber end would remain lit; should the circuit and the laser be intact and operational and the patient's life sign go out of tolerances, or should the transducer fail, only the reporting light would be extinguished by reason of the interposition of the shutter in the circuit.

Consistent with the preferred operational aspects of this invention, where the shutter is normally spring loaded in the light path, normal operation would show two lights on and one off for each circuit. If there is a break in the circuit, one light is on and two are off. If the laser becomes inoperative, all three fiber ends are dark. If the system is operative and the variable being measured goes out of tolerances, or the transducer fails, or the shutter fails, all three fiber ends would be lit.

Thus, it is clear that the system described herein is self checking and completely reliable since all failures signal an alert and also because in all instances, reporting and self checking, the observation is direct and without any energy conversion necessary.

This invention will now be described with reference to the drawing.

A laser 1, activated by a generator 2 emits a collimated light beam 3 which is split by one or more beam splitters which may comprise one or more semi-transparent mirrors 4a, 4b, 4c, 4d, 4e . . . (For convenience five beam splitters are shown-this is not a limiting value). A first portion 5 of beam 3 is fed, suitably via a mirror 6 or otherwise as spatial conditions require, and impinged directly on and normal to a first end 7 of a first optical fiber or a first bundle of such fibers 8. The other end 9 of this first fiber bundle is mounted 10 in a display panel 11. The fiber bundle end 9 may be protected with a suitable transparent or translucent covering 12 in the display panel.

Each of the other split portions 5a, 5b, 5c, 5d, 5e . . . of the laser beam 3 is impinged on a separate and distinct optical fiber or fiber bundle 8a, 8b, 8c, 8d, 8e . . . Each optical fiber bundle is mounted 13a on a shutter means 14. The fiber bundle is interrupted 15 within the shutter means so that the ends thereof 16a and 16b are exactly axially aligned and are spaced apart by as narrow a gap 17 as is practical considering that an opaque row 18 must fit therein between the fiber bundle ends. The downstream portion of the interrupted fiber bundle passes out of the shutter means 14 through a mounting 13b.

The shutter means 14 is composed of a housing 19, the above referred to opaque member 18, a switch means or meter movement 20, and wires connecting the switch to a conventional transducer 21. The transducer 21 induces activity in the switch 20 which moves the opaque member 18 into and out of the gap 17 whereby preventing light emerging from the fiber end 16a from impinging on the fiber end 16b or permitting such impingement respectively.

After passing through the shutter means 14, the return portion of the optical fiber bundles 22a, 22b, 22c, 22d, 22e . . . are fed back into the control panel 11 and mounted 10a, 10b, 10c, 10d, 10e . . . therein. If desired, suitable transparent or translucent coverings 12a, 12b, 12c, 12d, 12e . . . can be employed over their respective fiber bundle ends in the control panel. The various coverings 12 . . . 12e . . . can be color coded if desired.

The first portion of the split beam 5 is actually the residual portion of the beam after splitting out all those portions of the beam which will be used for monitoring purposes. In another aspect of this invention a lens system 23 can be provided in combination with the laser 1 to reduce the diameter of the laser beam so as to further intensify it.

In a further embodiment of this invention, only a portion of each fiber bundle 8 is severed within the shutter means 14 while another portion 24 of the fibers of this bundle by pass the opaque member 18 and bridge the gap 17. In this embodiment, an additional series of positions 25a, 25b, 25c, 25d, 25e . . . appear on the panel 11.

In a still further embodiment of this invention a lens system 26 is provided in the gap 17 in order to intensify the light emitted from the fiber end 16a and impinged on the fiber end 16b.

In another embodiment of this invention, the shutter means 14 can be removed from the circuit and suitable means 27, for example a digital or analog light modulator, substituted therefore which will impress the output of the transducer 21 onto the light beam 5a, . . . 5e . . . The light carrier beam with its impressed "message" is then fed into a centrally or otherwise located digital computer 28 where the information which was impressed on the light beam is taken off and stored in the computer for later assembly and use in the usual manner. It is also within the spirit and scope of this aspect of this invention to include a modulator for both digital and analog inputs as well as a simple switch go-no-go circuit in the same overall system.

Another aspect of this invention is in the interposition of an oscilloscope or oscillograph 29 in conjunction with light modulator 27 output with or without the computer input and go-no-go options discussed above. In regard to utilizing more than one type of the output options set forth above, it is within the spirit and scope of this invention to provide a beam splitter or beam splitters in the modulator output fed from the transducer so as to be able to use a single output of a modulator and/or shutter system to operate several readout devices.

While this description has generally been limited to the monitoring of life signs and other medical information it should be apparent that it is also applicable to monitoring substantially any kind of changing system. The only requirement it that the information being monitored is capable of causing a mechanical or wave energy function change in and of itself or in an appropriate transducer so that the output of this transducer can modulate a light beam.

It is a preferred aspect of this invention to utilize a pulsed light beam from the laser. This type of operation allows the generation of extremely high output light intensity while extending the useful life of the laser tube without any need to cool this component. Pulsing may be at any rate desired such as for example 20 to 40, preferably 30 cycles per second.

The fiber bundles of this invention are optical fibers of acceptible commerical quality. These are readily available on the open market. It is, of course, desirable to have a low attenuation as possible in order to maintain high intensity and signigicant range. These optical fiber light guides are made up of one or a multiplicity of fibers having diameters as small as about 6 microns. The fibers have a specific gravity of about 2.5 to 3.3 and are often silicic in nature. The bundled fibers have a diameter of about one-sixteenth to one-fourth of an inch, preferably about one-eighth of an inch.

The beam splitters which are used may conveniently be transparent materials with interference or metallically coated surfaces.

The laser is preferably an inert gas laser. preferably an argon laser. It is usual for the laser to operate without external cooling. It may emit monochromatic or polychromatic rays in which case the beam splitter may operate on an intensity, or wave length or polarization basis. The emitted laser beam has a diameter of about 80 thousandths of an inch but larger or small diameter beams can also be used.

In a simple go-no-go system, the shutter can be operated on about 5 to 20 millivolts supplied from the transducer.

Based upon present laser and optical fiber technology, th the monitoring system of this invention can have remove measuring stations up to about 200 feet from the monitoring station. It is anticipated that improvements in low attenuation optical fibers will extend this range to at least about 500 feet.

It is, of course, within the spirit and scope of this invention to convert the modulated light output into audible means, if such is desired, by conventional techniques.

It should be understood that although it is within the state of the art to convert the modulated light beam output of the instant monitoring device into other forms of energy as noted above, this is not necessary for the disclosed functional features to be realized but is only an alternative or supplement to the basic optical direct read out system and can be used in combination therewith or instead thereof.

The transducers which are useful in combination with the monitoring system of this invention are generally conventional. That is, many instruments are well known and commercially available for measuring a variety of variables. For example, in the medical field there are temperature recorders, electrocardiograms, electroencephalograms, pulse meters, respiration meters, devices for analyzing the blood and the like all of which are adaptable to being modulated as described in this disclosure. For further details on known transducers in the medical field, reference is made to the book "Medical Electronic Equipment", 1969–1970, Editors Dummer & Robertson, Vol. II, Pergamon Press, and other similar books published by suppliers.

What is claimed is:

1. A monitoring system comprising a collimated light source; semitransparent beam splitter means aligned with the beam emitted from said collimated light source for dividing said beam into a plurality of beam portions; first light guide means optically aligned at one end with a first of said beam portions; means for viewing the other end of said first optical light guide means; second optical light guide means optically aligned at one end with a second of said beam portions; transducer means for sensing a variable being monitored; modulating means coupled to said transducer located in the light path intermediate the ends of said second optical light guide means for impressing the transducer sense onto said second beam portion; and remote read out means comprising the end of said second optical light guide means.

2. A monitoring system as claimed in claim 1 wherein said read out means is an optical view of the other end of said second optical light guide means.

3. A monitoring system as claimed in claim 1 including a gap means in an intermediate portion of said second optical light guide means, a substantially opaque shutter disposed for interposition in said gap means; an operative connection of said transducer to said shutter adapted to move said shutter into or out of said gap as a function of said transducer sense whereby preventing or permitting, respectively, said laser light beam from crossing said gap.

4. A monitoring system as claimed in claim 1 wherein said remote read out means comprises an oscillograph.

5. A monitoring system as claimed in claim 1 including computer means downstream of said modulator adapted to be fed by the modulated light beam in said second optical light guide.

6. A monitoring system as claimed in claim 3 wherein said transducer is adapted to receive and convey information relative to human life signs and wherein said shutter is operative in response to said life signs.

7. A monitoring system as claimed in claim 1 wherein said beam splitter means, said light guide means, said remote read out means and said viewing means are all substantially non-electronic.

8. A monitoring system as claimed in claim 1 wherein said light guide means are Fibers.

9. A monitoring system as claimed in claim 1 including multiple beam splitter means coverting said light laser beam into multiple beam portions and including multiple second beam portions, multiple transducers, multiple second optical light guide means and multiple modulators, each set of transducer, modulator, light guide means and beam splitter being associated with a single second beam portion to measure and report to said remote read out a separate sense.

10. A monitoring system as claimed in claim 1 wherein said modulator comprises a spring loaded shutter means and wherein said read out means is digital.

11. A monitoring system as claimed in claim 1 wherein said columated light source is a laser.

12. A monitoring system as claimed in claim 1 wherein said second of said beam portions is divided into a first subbeam portion and a second subbeam portion, said modulator located in the optical path of said first subbeam portion, and said second subbeam portion being remotely directly read out as a check on the integrity of the second of said beam portions.

* * * * *